US00RE34643E

United States Patent [19]

Payne

[11] E Patent Number: Re. 34,643

[45] Reissued Date of Patent: Jun. 21, 1994

[54] SHORT CIRCUIT FAULT ISOLATION MEANS FOR ELECTRICAL CIRCUIT ARRANGEMENTS

[75] Inventor: Roger D. Payne, Horndean, England

[73] Assignee: Apollo Fire Detectors Limited, Hampshire, England

[21] Appl. No.: 957,796

[22] Filed: Oct. 8, 1992

Related U.S. Patent Documents

Reissue of:

[64] Patent No.: 4,528,610
Issued: Jul. 9, 1985
Appl. No.: 510,931
Filed: Jul. 5, 1983

[51] Int. Cl.[5] ..... H02H 3/08

[52] U.S. Cl. ..... 361/62; 361/63; 361/67; 340/505; 340/825.54

[58] Field of Search ..... 361/62, 67, 63; 340/505, 147, 256, 825.54; 324/51; 179/15.

[56] References Cited

U.S. PATENT DOCUMENTS

| | | | |
|---|---|---|---|
| Re. 28,958 | 9/1976 | Zafiropulo et al. | 340/147 |
| 2,354,138 | 7/1944 | Parsons | 361/62 |
| 2,525,527 | 10/1950 | Dannenberg | 361/62 |
| 2,595,032 | 4/1952 | Wensley | 361/67 |
| 3,652,798 | 3/1972 | McNeilly et al. | 179/15 |
| 4,404,548 | 9/1983 | Mueller et al. | 340/505 |

FOREIGN PATENT DOCUMENTS

| | | | |
|---|---|---|---|
| 042501A1 | 5/1981 | European Pat. Off. | G08B 26/00 |
| 1383777 | 2/1975 | United Kingdom | G08C 25/02 |
| 1567971 | 5/1980 | United Kingdom | H04L 11/08 |

OTHER PUBLICATIONS

International Conference On Communications, vol. 1, 8th-12th Jun. 1980, pp. 14.3.1-14.3.5, Seattle, USA, C. H. Draft: "A 1 MBIT/SEC data loop for security sites" *Abstract*.

*Primary Examiner*—A. D. Pellinen
*Assistant Examiner*—S. Jackson
*Attorney, Agent, or Firm*—Welsh & Katz, Ltd.

[57] ABSTRACT

Circuitry is described for isolating a section of a loop circuit (L) from a bi-directional supply unit (20) in the event of a short circuit in the section. One or more circuit elements (21), such as fire detectors, are connected in respective portions of the loop circuit and between respective pairs of bi-directional isolators (1,2,3,4). Each isolator includes switching means (TR1,TR3) providing low and high impedance paths for respectively supplying current to said circuit elements and isolating said circuit elements from the supply unit (20). Each isolator also includes sensing means (TR2, D1, DS7) for sensing a short circuit in any one of the circuit elements (21) whereby the sensing means causes a change in state of the switching means from the low to the high impedance path thereby isolating the circuit elements in the respective section of the loop from the supply unit.

10 Claims, 6 Drawing Sheets

SHORT CIRCUIT FAULT ISOLATION MEANS FOR ELECTRICAL CIRCUIT ARRANGEMENTS

Matter enclosed in heavy brackets [ ] appears in the original patent but forms no part of this reissue specification; matter printed in italics indicates the additions made by reissue.

The invention relates to means for improving the reliability of electrical circuit arrangements by the introduction of means for isolating short circuit faults from other parts of the said electrical circuit arrangement and more particularly though not exclusively to electrical circuit arrangements forming part of a fire or smoke detection system.

The central control unit of a fire detection system monitoring extensive premises may need to be connected to a large number of fire detectors sited throughout the premises. In order to identify with some precision the location of any fire it is state of the art practice to divide the protected premises into local areas or fire zones each separately monitored by the control unit. If many detectors are required to adequately protect the premises it is usually uneconomic to have as many fire zones as detectors because of the high cost of wiring each detector directly to the control unit and the cost of providing a multiplicity of monitoring circuits. In practice precision is usually compromised by directly interconnecting closely associated detectors to form fewer, less localised fire zones and connecting each group of detectors to the control unit as shown schematically in FIG. 1. The control unit 19 identifies in which zone a fire has been detected but not which detector 21 has responded. In such systems the maximum number of detectors 21 grouped together to form a zone is normally restricted to about 25 detectors. The interconnection of a larger number of detectors is not normally practiced, firstly because the greater area monitored by a greater number of detectors reduces to an unacceptable level the precision with which a fire can be located, and secondly because the occurrence of a circuit fault, such as a short circuit, in the wiring interconnecting detectors can render all the detectors in that zone inoperative and place an unacceptably large area at risk pending repairs, even if the presence of such a fault is indicated at the control unit 19.

Recent technological developments such as the introduction of microprocessors and improved data transmission techniques, now make it practical to manufacture detectors incorporating circuitry means by which each detector in a fire detection system can be made responsive to a uniquely coded address signal that may with advantage be superimposed on the wiring supplying power from the control unit to the interconnected detectors. When a particular detector receives its unique address signal from the control unit the circuitry means associated with the detector responds by transmitting to the control unit a signal containing information about the status of the detector. The control unit may [be], *by* reference to its pre-programmed memory, match the address code of the detector with a precise identification of the detector's location. Therefore, in principle the control unit 20 is able to determine both the status and the precise location of every addressable detector 21 in a fire detection system of the type shown schematically in FIG. 2 without the need to zone detectors on separate circuits. The elimination of a multiplicity of zone circuits and a simplification of installation wiring are apparent potential benefits of using addressable detectors. In practice the maximum number of addressable detectors connected on one circuit of this type is normally restricted to about 25 detectors because the occurrence of an open or short circuit fault in the wiring can render some or all of the detectors on the circuit inoperative and place an unacceptably large area at risk pending repairs. If detectors are interconnected on a wiring loop L, then a single open circuit fault will not render any of the detectors inoperative. The improved reliability afforded by the use of ring circuit may in some circumstances permit a marginal increase in the number of interconnected addressable detectors but the vulnerability of the circuit to a short circuit fault remains a major constraining influence.

Thus the problem to be solved is to provide means whereby circuit elements in a loop circuit can remain in large part operational in the event of a short circuit.

The invention solves this problem by providing circuitry for isolating a section of a loop circuit (L) from a bi-directional supply unit (20) in the event of a short circuit in said section, characterised in that one or more circuit elements (21) are connected between bi-directional isolators (1,2,3,4) in each section of the loop circuit (L), each of said isolators (1,2,3,4) comprising switching means (TR1, TR3) providing a low impedance path and a high impedance path, said low impedance path supplying current to said circuit elements from said supply unit (20) and said high impedance path isolating said circuit elements from said supply unit (20); and sensing means (TR2, D1, D7) for sensing a short circuit in any one of said circuit elements; said switching means (TR1, TR3) being responsive to said sensing means (TR2, D1, D7) to cause a change in state from the low impedance path to the high impedance path in the event of said short circuit.

Figure 1:
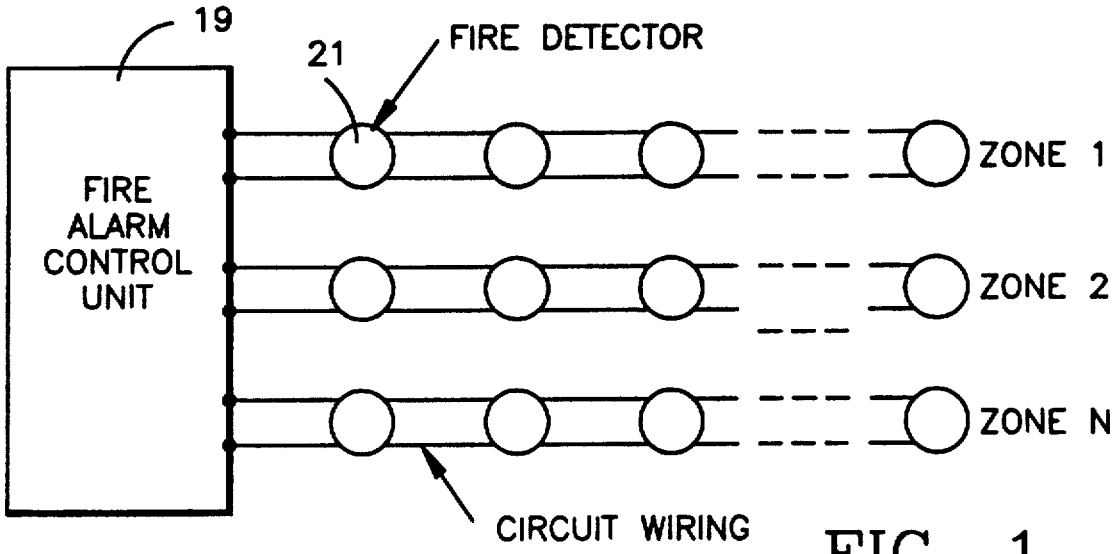
FIG. 1 PRIOR ART
FIG. 1 illustrates a conventional fire detection system.
Figure 2:
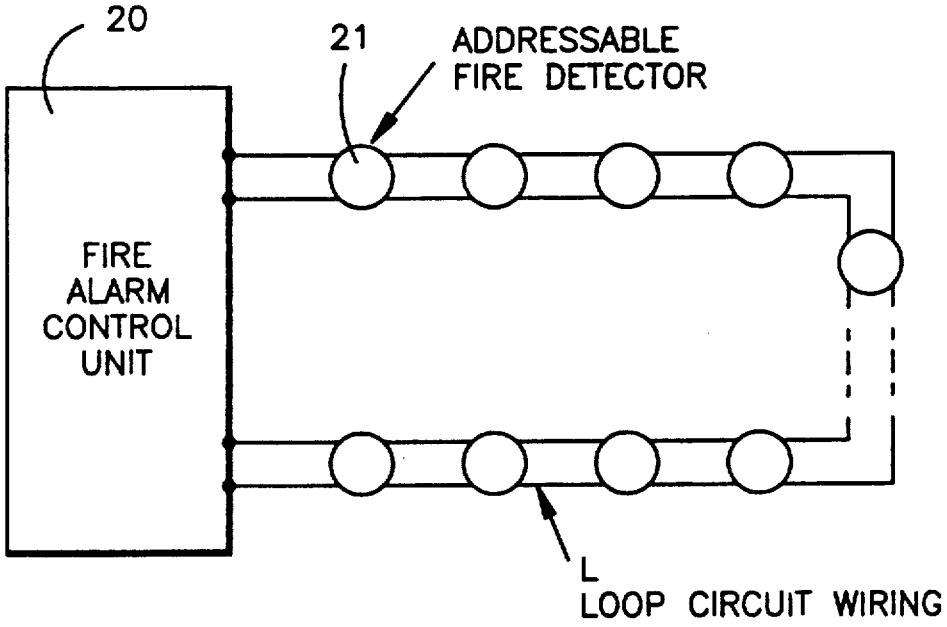
FIG. 2 PRIOR ART
FIG. 2 illustrates another conventional fire detection system including addressable fire detectors.
Figure 3:
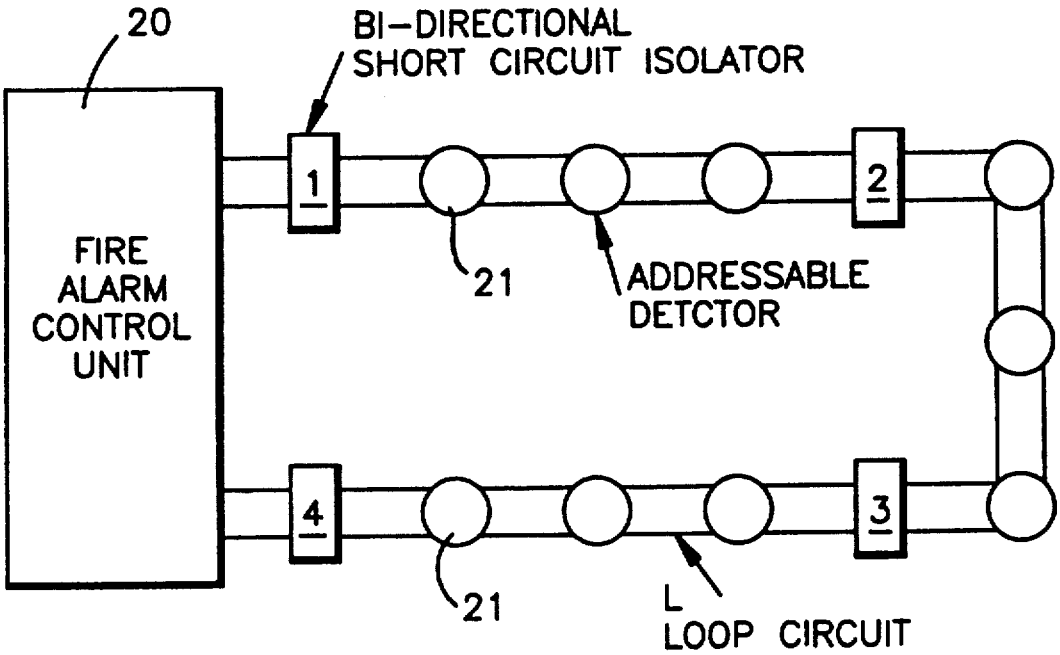
FIG. 3 illustrates an embodiment of the invention.

FIG. 3 illustrates an embodiment of the invention in the form of a control unit 20 connected to a loop circuit L of detectors in which groups of one or more detectors 21 are separated by devices containing a novel circuit arrangement as disclosed herein and termed bi-directional short circuit isolators (1,2,3,4). Each isolator (1,2,3,4) contains a circuit arrangement (see FIGS. 4 and 5 and following description) which normally provides bi-directional low impedance circuit paths for both of the supply wiring circuits forming the loop circuit L such that detectors 21 may receive power and address signals from either end of the loop L and transmit data signals in either direction to the control unit 20. The circuit arrangement also contains sensing means (TR2, D1, D7 of FIG. 4 or 8) for detecting a short circuit of the loop circuit wiring on either side of the circuit arrangement and switching means (TR1 and TR3 of FIG. 4 or 5) controlled by said sensing means and arranged to switch from a low impedance path (through TR1 or TR3) to a high impedance path (TR1 and TR3 biased off) in response to a short circuit fault in the loop circuit. If a short circuit occurs in the type of circuit arrangement shown in FIG. 3, the short circuit will be detected by sensing means in bi-directional isolators (1,2,3,4) on both sides of the short circuit and the impedance of [theisolators] *the isolators* adjacent to the short circuit fault will switch to a high state thus isolating the short circuit fault from the detectors 21 and other isolators located between each high impedance isolator and the control unit 20. Only those detectors 21 located between the adjacent bi-directional isolators (e.g. 2 and 3) are rendered inoperative by a short circuit fault, since the detectors 21 will still receive current (via isolator 1) which passes through the lines which connect them on one side to unit 20 (i.e. as far as, but not beyond isolator 2), and (via isolator 4) which passes through the lines which connect them to the other side of unit 20 (i.e. as far as, but not beyond isolator 3).

Ideally bi-directional short circuit isolators could, with advantage, be connected alternately with detectors such that a short circuit fault of the loop wiring or of a detector renders only one detector inoperative. In practice this may not always be possible because of economic considerations and because isolators may have a low but finite impedance in the low impedance state which gives rise to a cummulative volt drop around the loop circuit if a large number of isolators are used. Embodiments of isolators based on semiconductor circuits can be expected to provide a volt drop of less than 0.8 volts in the low impedance state. Thus ten isolators may produce up to a 7.2 volt drop from the first isolator to the 10th isolator if a short circuit occurs between the 10th and 11th isolator in a system fitted with 11 isolators for example. A system of this type fitted with modern detectors having a wide operating voltage range can be expected to accommodate a 7.2 volt drop without any performance degradation. The maximum number of detectors which may be connected between isolators will be largely determined by the maximum tolerable number of detectors than can be rendered inoperative in the event of a short circuit. By way of example this number may be approximately 25 if comparable performance with that of conventional fire detection systems using non addressable detectors is used as the criterion. It will therefore be perceived that a loop system using say 11 bi-directional short circuit isolators may interconnect approximately 250 addressable detectors and be no more degraded by a short circuit fault than a conventional 10 zone system with 25 detectors per zone. The loop system of addressable detectors also has the advantages that an open circuit fault will not render any detectors inoperative and that the location of detectors can be identified with precision.

Figure 4:
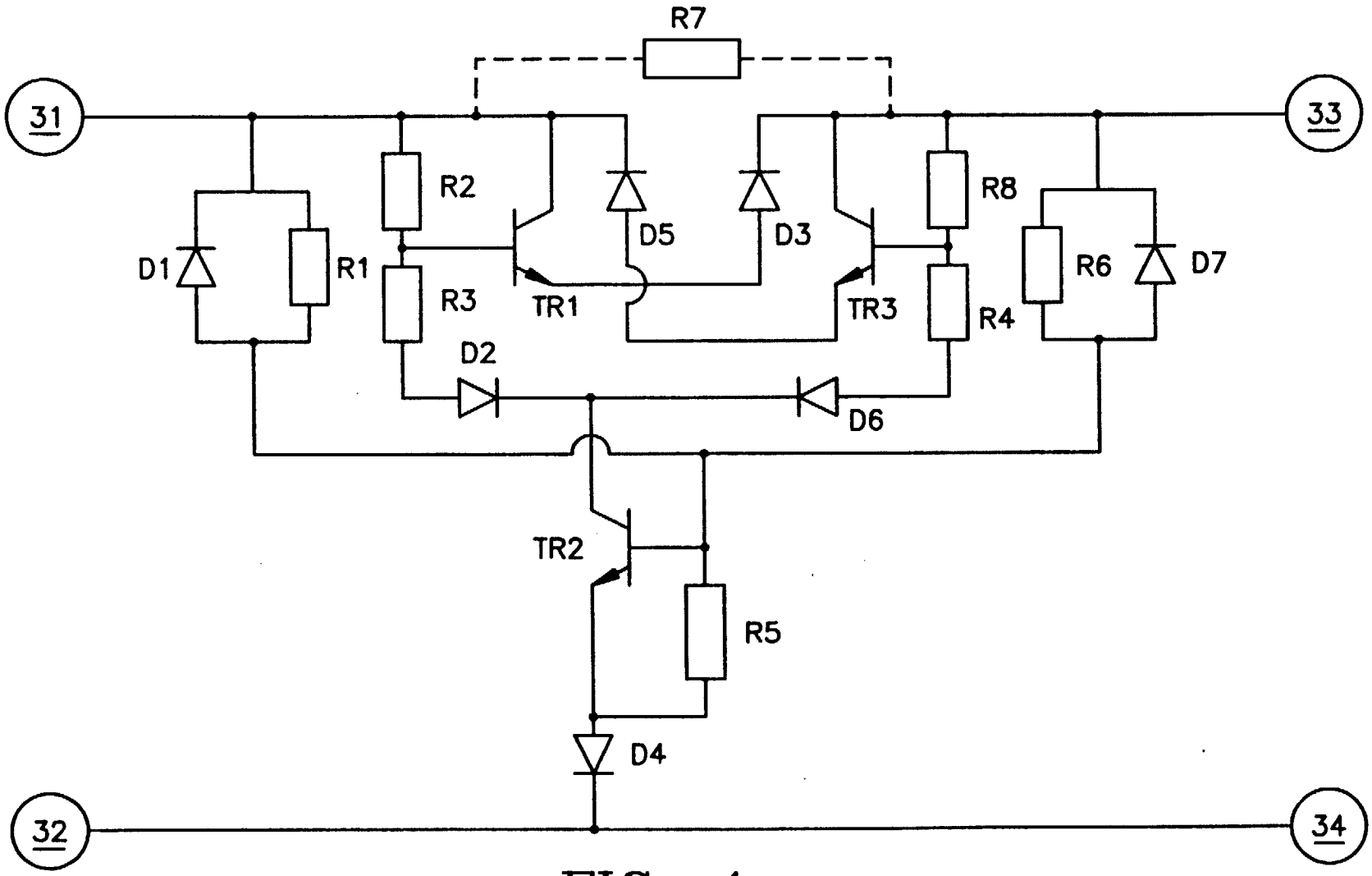
FIG. 4 illustrates a circuit diagram of one form [or] *of* bi-directional isolator according *to* the invention.

FIG. 4 shows one form of a practical embodiment in component form of a bi-directional circuit isolator.

When power is applied to terminals 31 and 32 transistor TR2 is driven into conduction by virtue of base drive derived from resistor R1 and bias resistor R5. Transistor TR2 in turn drives transistor TR1 into conduction via diode D4 steering diode D2, resistor R3 and bias resistor R2 thus effecting a low impedance path from terminal 31 to terminal 33 via TR1 and diode D3. Similarly and by virtue of the symmetry of the circuit it can be shown that a low impedance path can be effected between terminals 33 and 31 via transistor TR3 and diode D5 if power is applied to terminals 33 and 34. A low impedance always exists between terminals 34 and 32.

When the isolator as described above is incorporated in a loop circuit the transistor TR1 or TR2 associated with the input terminals receiving the higher supply voltage will be conductive and provide the low impedance path. The [terminals] *terminal* receiving the higher voltage is determined by the proximity of the isolator to the control unit, the presence or absence of short or open circuit faults and possibly the voltage level of any super-imposed data transmission signal.

If a short circuit fault occurs across the loop circuit wiring connected to terminals 33 and 34 the drive current for transistor TR2 base cannot be sourced via R6 nor can it be sourced from terminal 31 via R1 because the now forward biasing of diode D7 does not provide sufficient bias voltage to drive transistor TR2 and diode D4 into conduction. The short circuit fault causes TR2 to switch off which in turn ensures that both TR1 and TR3 are both switched off thus isolating the short circuit from that part of the loop circuit connected to terminals 31 and 32. Similarly and by virtue of the symmetry of the circuit it can be shown that a short circuit across wiring connected to terminals 31 and 32 will be isolated from that part of the loop circuit connected to terminals 33 and 34.

Resistor R7 is an optional resistor normally of high value which may be necessary to improve the switch on characteristics of the isolator when power is first applied in circumstances where the detectors connected to the circuit have a capacitive input or require a higher quiescent current than can initially be sourced via resistors R1 and R6 in parallel with D7 or R6 and R1 in parallel with D1 as circumstances dictate.

Figure 5:
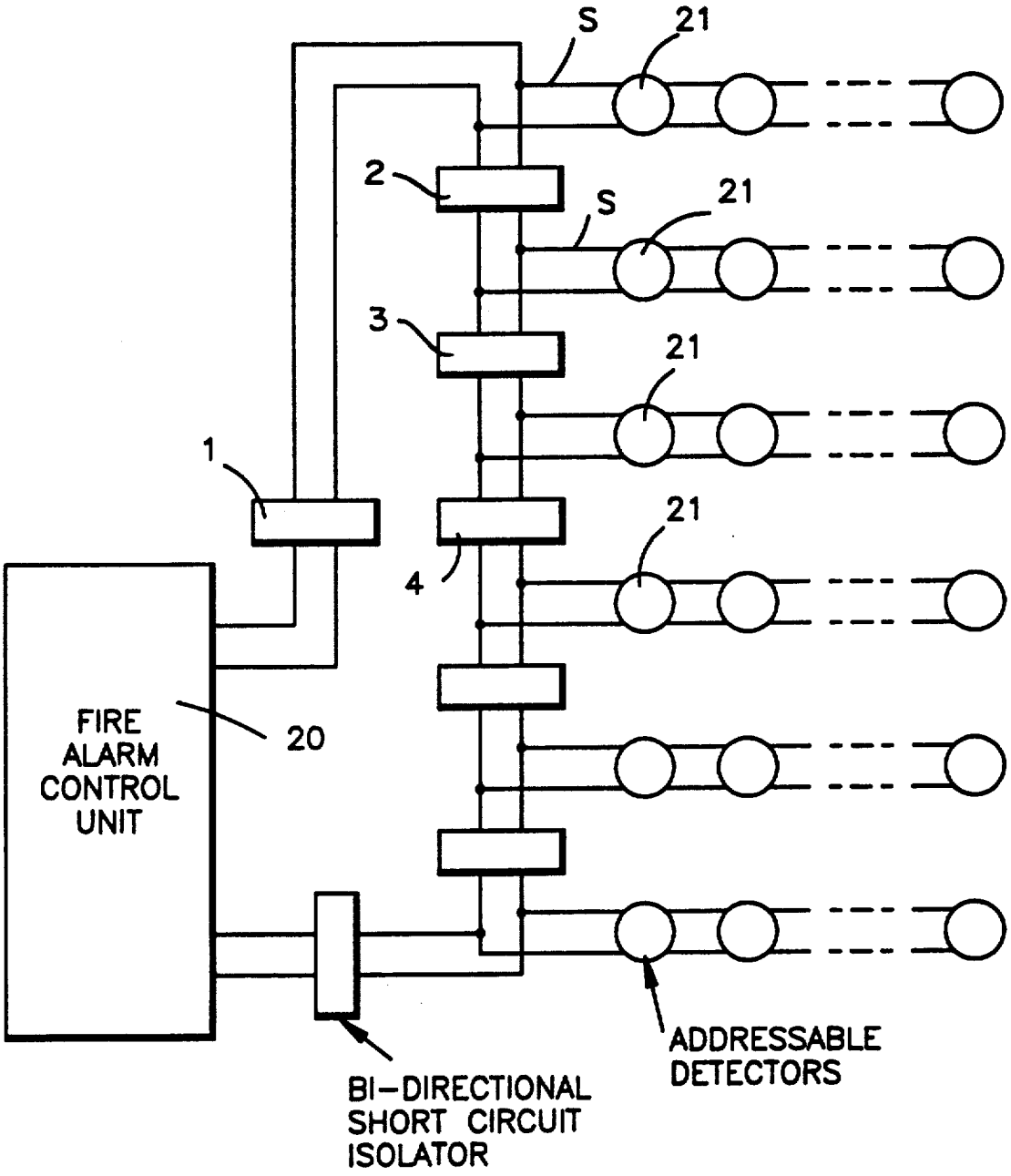

A further circuit arrangement incorporating short circuit isolators is shown in FIG. 5. In this arrangement the isolators are connected in a loop circuit with groups of detectors spurred off between isolators rather than being connected to the loop circuit directly. Those skilled in the art will recognise that this is a particularly suitable circuit arrangement for multi-storey buildings.

It is recognised that an open circuit in the spur wiring could render inoperative those detectors furthest from the loop wiring and beyond the open circuit, but this will not result in an intolerable situation if the number of detectors per spur is limited to about 25 as in conventional zone systems.

Figure 6:
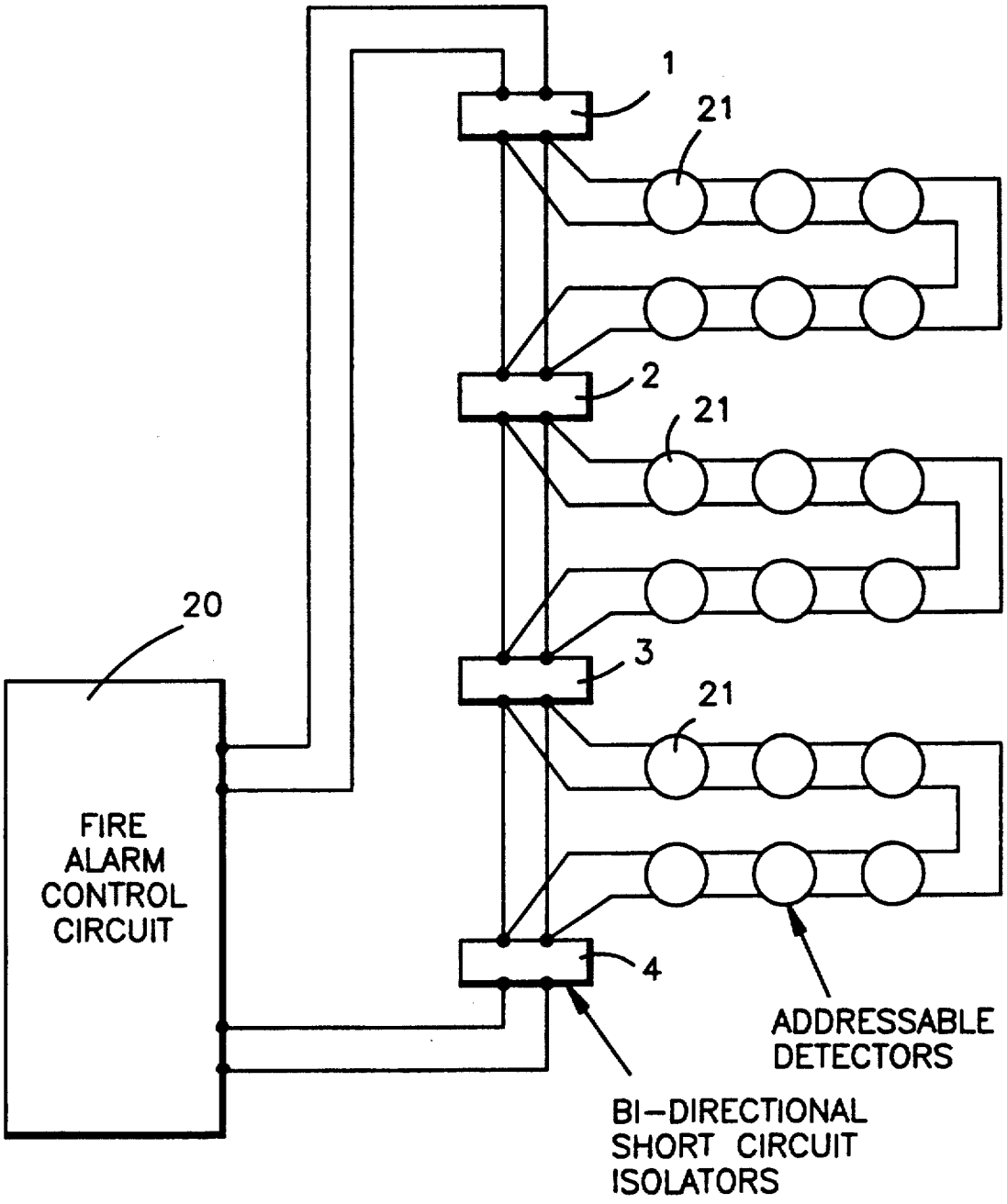

A further circuit arrangement is shown in FIG. 6. This arrangement has the advantages of the loop circuit and the additional advantage that more than one open circuit fault in the wiring linking detectors does not render any detectors inoperative unless two or more open circuits occur on the same spur.

Further circuit arrangements formed by combining all or parts of circuit arrangements disclosed above and containing one or more isolators whether bi-directional or uni-directional are embodiments of the invention.

The short circuit isolators disclosed here may be constructed in various forms. They may with advantage be incorporated within control units and within detectors or they may be constructed as separate units which are wired into circuit arrangements as required.

The embodiment of the invention disclosed by way of example in FIG. 4 may be implemented in complementary form semiconductors.

Figure 7:
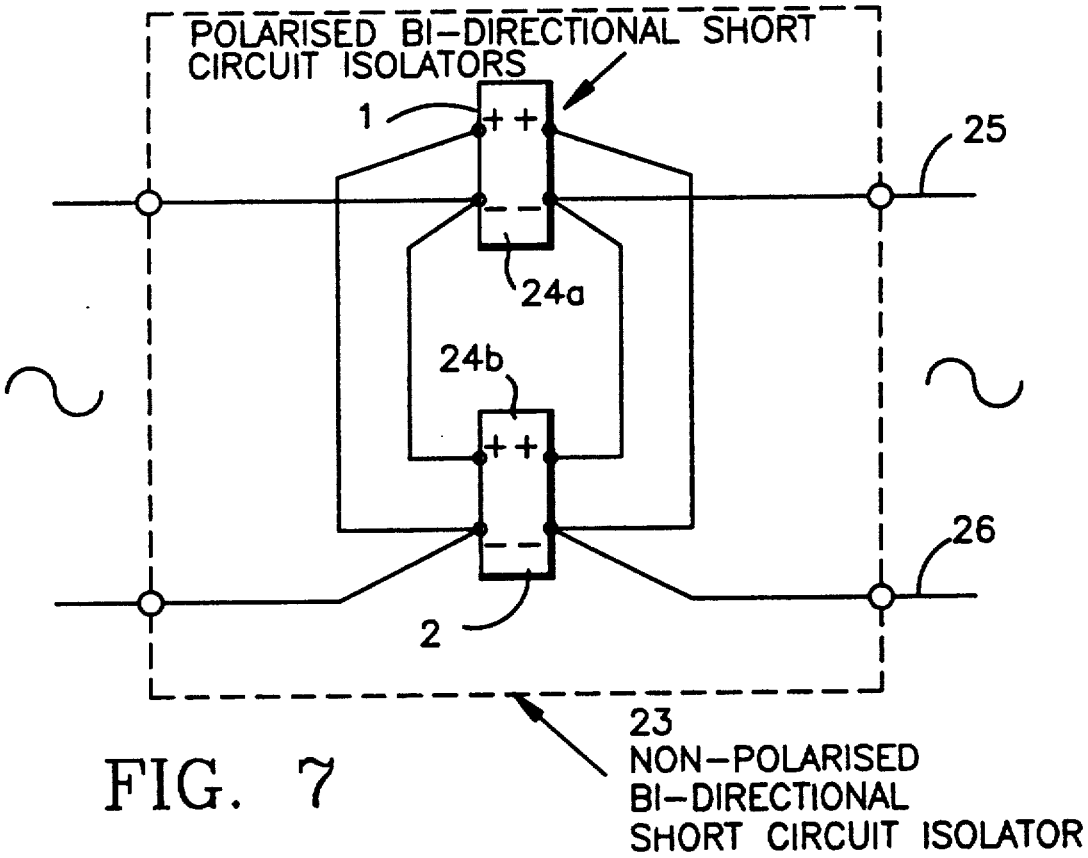
FIGS. 5–8 illustrate further respective embodiments of the invention.

A further embodiment of the invention having application with circuits using an alternating electrical supply is illustrated in schematic form in FIG. 7. In this figure, a non-polarised bi-directional short circuit isolator 23 (represented by the broken line) comprises two polarised bi-directional short circuit isolators 24a, 24b, interconnected as shown, and connected to a.c. supply lines 25, 26.

Figure 8:
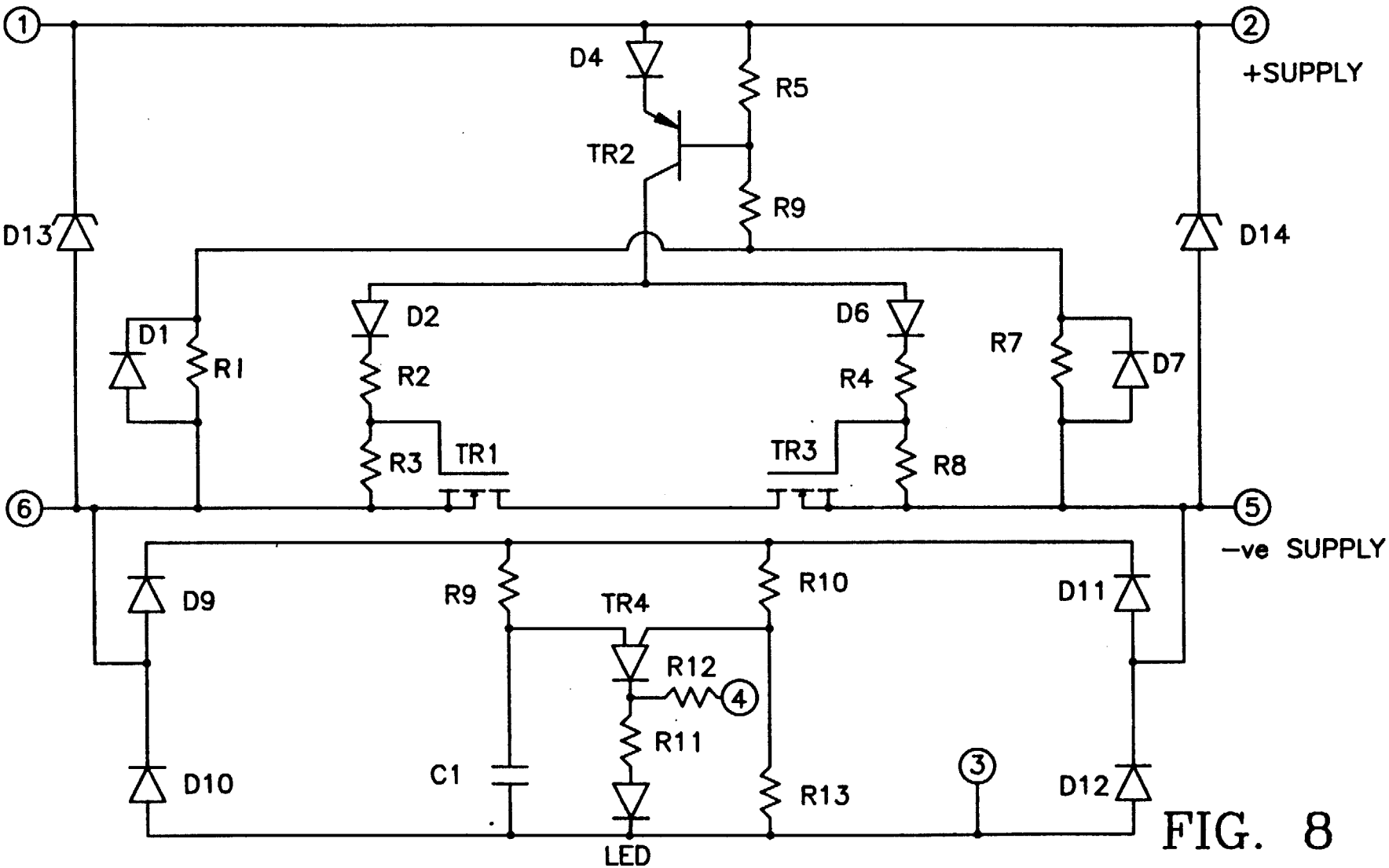

FIG. 8 illustrates an improvement in the circuitry of FIG. 4 (similar reference [numeral] *numerals* or letters identify similar components). In FIG. 8, transistors TR1 and TR3 are VMOS field effect transistors. VMOS devices have the advantage that their "on state" impedance is very low, typically 5 ohms to 0.3 ohms. This means that, in most applications, a smaller voltage drop will be developed across the isolator, thus permitting an increase in the number of isolators which may be introduced into a circuit. Because VMOS devices conduct current bi-directionally in the "on state" it is possible to connect them in series. This has enabled diodes D5 and D3 to be eliminated thus further reducing the voltage drop across the device.

In accordance with another improvement (shown by FIG. 8) an LED indicator LED 1 is provided which illuminates when the short circuit isolator switches to a high impedance state in response to the presence of a short circuit. LED 1 is incorporated within a bridge rectifier circuit, including diodes D9–D12, which produces a rectified voltage in response to a short circuit on either side of the isolator. LED 1 is caused to flash periodically by incorporating it in a oscillator circuit comprising a conventional programmable unijunction transistor oscillator and associated components TR4, R9–R13, C1. By causing LED 1 to flash, the current required to provide indication when a short circuit is detected is reduced.

In accordance with further improvements (shown by FIG. 8), two zener diodes D13, D14 are provided to protect the short circuit isolator from high voltage transients and accidental polarity reversal, and a 10K ohm resistor R9 is connected to the base of TR2 to give a degree of control over the threshold voltage of the short circuit sensing circuitry.

I claim:

1. [Circuitry] *A short circuit detection system comprising a loop circuit, said loop circuit being connected to a bi-directional power supply unit, the system further comprising circuitry* for isolating a section of [a] *said* loop circuit from [a bi-directional] *said* supply unit in the event of a short circuit in said section, said circuitry comprising one or more [circuit elements] *fire detectors which are operationally dependent on the power supplied by said supply unit, said first detectors being* connected between *adjacent* bi-directional isolating means in each section of said loop circuit, each of said isolating means comprising first and second terminal means coupled respectively to sequential sections of the loop circuit, translator switching means providing a low impedance path and a high impedance path, said low impedance [path] *paths* supplying current [to said circuit elements] *continuously to said first detectors* from said supply unit and said high impedance [path] *paths* isolating said [circuit elements] *fire detectors* from said supply unit; and sensing means for sensing a short circuit in either one of the sequential sections coupled to said first and second terminal means; said transistor switching means being biased by said sensing means to cause said transistor switching means to provide said low impedance path in the absence of said short circuit and to cause a change in state from said low impedance path to said high impedance path in the event of said short circuit [so as to isolate the elements in the section coupled to the other of said first and second terminals from said short circuit]*; said sensing means being independently and simultaneously responsive to a change of voltage level in a short circuited section of the loop between adjacent ones of said isolating means, whereby only those of said isolating means immediately adjacent the short circuited section autonomously and simultaneously block the supply of power to said first detectors therebetween without preventing other of said isolating means from supplying current continuously from said supply unit to those of said first detectors which are not isolated.*

2. [Circuitry] *The short circuit detection system* according to claim 1, wherein a plurality of said [circuit elements] *fire detectors* is connected in series between [each pair] *adjacent* of said bi-directional isolating means.

3. [Circuitry] *The short circuit detection system* according to claim 1, wherein a plurality of said [circuit elements] *fire detectors* is connected in respective spurs between [each pair] *adjacent* of said isolating means.

4. [Circuitry] *The short circuit detection system* according to claim 1, wherein a plurality of said [circuit elements] *first detectors* is interconnected in respective loops between [each pair] *adjacent* of said isolating means and [each pair] *adjacent* of said isolating means [is] *are* also interconnected.

5. [Circuitry] *The short circuit detection system* according to claim 4 and adapted for the supply of alternating current, wherein each of said isolating means is a non-polarized [from] *form* and comprises polarized isolators connected to respective lines supplying said alternating current, opposite poles of said isolating means being interconnected.

6. [Circuitry] *The short circuit detection system* according to claim 1, wherein, in each of said isolating means, said transistor switching means comprises transistors connected to respective diodes for conducting currents in respective forward and reverse directions in said low impedance path.

7. [Circuitry] *The short circuit detection system* according to claim 6, wherein an impedance is connected in a shunt path[,] across said transistor switching means in order to improve the switch-on characteristics of said isolating means when power is first applied.

8. [Circuitry] *The short circuit detection systems* according to claim 7, wherein, in each of said isolating means, said transistor switching means comprises VMOS devices which conduct currents bi-directionally in said low impedance path.

9. [Circuitry] *The short circuit detection system* according to claim 8, wherein an oscillating circuit is connected across a bridge rectifier circuit in order to operate an indicator intermittently on detecting a short circuit on either side of said isolating means.

10. [Circuitry] *The short circuit detection system* according to claim 6, wherein said sensing means comprises a transistor for biasing said transistors of said transistor switching means to provide respective low impedance paths, said transistor of said sensing means being biased by current derived from respective diode circuits, which diode circuits become respectively forward[,] or reverse biased in response to a short circuit in one of said circuit elements whereby said transistor of said sensing means is biased into a non-conducting state, thereby biasing said transistors of said transistor switching means into a non-conducting state to provide respective high impedance paths.

* * * * *